United States Patent [19]

Tanguy et al.

[11] 4,092,835
[45] June 6, 1978

[54] ELECTRICAL APPLIANCE FOR MAKING SORBET

[76] Inventors: Pierre Tanguy, 30, rue de Dijon, 21000 Daix; André Faivre, 14, rue Adolphe Dietrich, 21000 Dijon, both of France

[21] Appl. No.: 713,211

[22] Filed: Aug. 9, 1976

Related U.S. Application Data

[62] Division of Ser. No. 543,798, Jan. 24, 1975, Pat. No. 4,009,588.

[30] Foreign Application Priority Data

Jan. 30, 1974 France .................................. 74 03045

[51] Int. Cl.$^2$ ........................ G05D 24/02; A23G 9/00
[52] U.S. Cl. ........................................ 62/136; 62/342; 366/98; 366/206
[58] Field of Search .................. 62/136, 342; 259/108, 259/DIG. 19

[56] References Cited

U.S. PATENT DOCUMENTS

| | | | |
|---|---|---|---|
| 1,956,322 | 4/1934 | Grant | 62/136 X |
| 2,793,505 | 5/1957 | Finch | 259/122 X |
| 2,808,706 | 10/1957 | Updegraff | 62/136 |
| 3,916,637 | 11/1975 | Marrie | 62/136 |

*Primary Examiner*—William E. Wayner
*Attorney, Agent, or Firm*—Bacon & Thomas

[57] ABSTRACT

An appliance for making sorbet or ice cream and including means for preventing the mixer blades from becoming locked in the ice by effecting the progressive withdrawal of these blades from a vertical orientation towards a horizontal orientation under the action of the opposing torque applied to the blades by the hardening of the ice during freezing, and an automatic stopping device which is mechanically operable as a result of the withdrawal of the blades or a part associated therewith to break the motor supply circuit when the blades reach their withdrawn position.

4 Claims, 13 Drawing Figures

Fig. 3
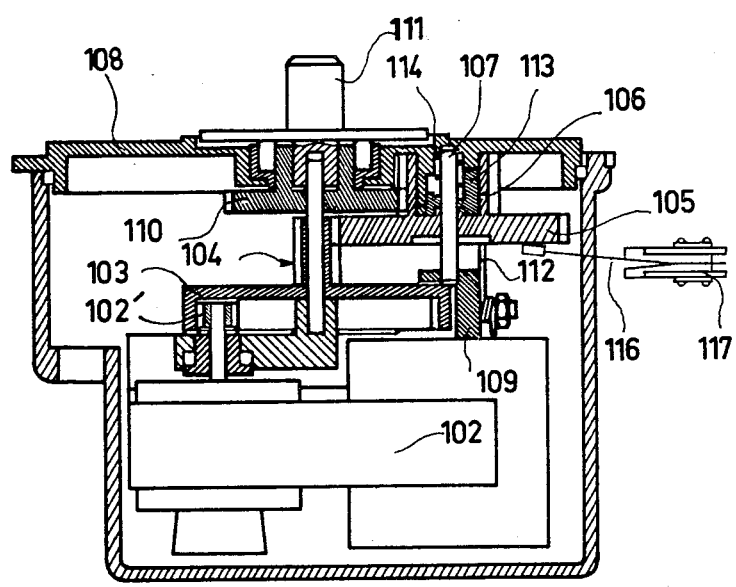
Fig. 4
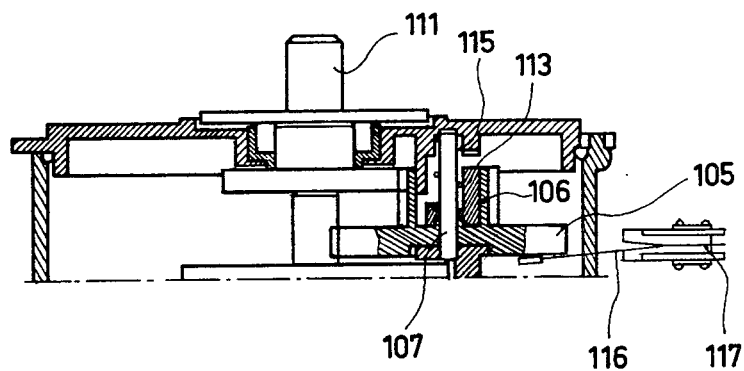
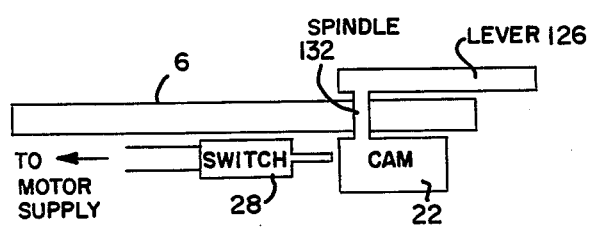
Fig. 12
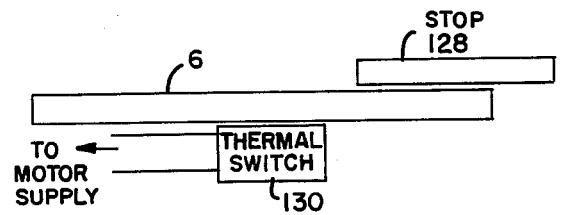
Fig. 13

ELECTRICAL APPLIANCE FOR MAKING SORBET

This is a division, of application Ser. No. 543,798, filed Jan. 24, 1975, now U.S. Pat. No. 4,009,588.

BACKGROUND TO THE INVENTION

This invention relates to an appliance for making sorbet or ice cream.

U.S. patent application Ser. No. 292,121 filed Sept. 25, 1972, now U.S. Pat. No. 3,916,637, relates to an electrical domestic appliance intended for making ice cream and fruit sorbet in a cold enclosure, such as the ice box of a refrigerator. Said application is herein incorporated by reference. The principal feature of this apparatus is the provision of means which prevents the stirrer blades from becoming blocked in the ice by effecting progressive withdrawal of those blades from a vertical orientation towards a horizontal orientation under the action of the opposing torque applied to the blades by the hardening of the ice during freezing. The appliance is especially intended for making ice cream and sorbet with two flavours.

U.S. patent application No. 429,820 filed Jan. 2, 1974, now U.S. Pat. No. 3,926,414 relates to a device for automatically stopping the gear motor of the appliance and for indicating when the blades reach their withdrawn position. Said application is herein incorporated by reference. This device is characterised by the fact that one of the stepped pinions of a reducing mechanism, which transmits the rotational movement of the motor to a sprocket driving the blades, is axially displaceable under the action of the reactive torque arising from the resistance offered to the mixer blades by the thickening of the preparation as it freezes.

In one embodiment described in this second patent, a microswitch with two stable positions is used, a moving coil of the microswitch being activated on the one hand by the aforementioned axial displacement and, on the other hand, by the bending of a deformable bimetallic element under the effect of increase in temperature of the magnetic circuit of the motor. The microswitch has to be reset by a push-button extending through the cover of the gear motor housing.

Although working satisfactorily, this embodiment does have certain disadvantages. Thus, a bimetallic strip is difficult to fix either by welding or by screwing due to the structure of the laminar magnetic circuit. In addition, the push-button is difficult to seal.

The object of the present invention is to provide an appliance having an improved automatic stopping device.

BRIEF SUMMARY OF THE INVENTION

According to the invention, there is provided an appliance for making sorbet or ice cream and including means for preventing the mixer blades from becoming locked in the ice by effecting the progressive withdrawal of these blades from a vertical orientation towards a horizontal orientation under the action of the opposing torque applied to the blades by the hardening of the ice during freezing, and an automatic stopping device which is mechanically operable as a result of the withdrawal of the blades or a part associated therewith to break the motor supply circuit when the blades reach their withdrawal position.

FURTHER FEATURES OF THE INVENTION

In a first embodiment of the invention, the automatic stopping device is activated by axial displacement of a stepped pinion, which engages a miniature reversing switch with one stable position. This reversing switch is thus held in an unstable position in which it completes the motor feed circuit as long as the torque is applied to the blades, and is released into its stable position in which it breaks the motor supply circuit, optionally releasing an indicating signal at the same time, as soon as the withdrawal of the blades causes the torque to disappear.

In this embodiment, the miniature reversing switch is reset either by acting manually on an intermediate mechanism for transmitting the axial displacement to the movable armature of the microswitch, or preferably by manual application of force to an arm supporting the blades, in the direction opposite to the normal stirring direction. The first embodiment is more fully described in the parent application hereof, now U.S. Pat. No. 4,009,588.

In a second embodiment of the invention, the automatic stopping device is activated immediately on completion of the withdrawal of the blades by a projection on one of the blades, which is adapted to reach the raised position shortly after the other blade or blades.

In this second embodiment, the projection either indirectly operates the movable armature of a microswitch or reversing switch to break the motor supply circuit, or comes into contact with a stop, preferably resiliently mounted, the resulting heating of the magnetic circuit of the motor acting on a temperature limiter which breaks the motor supply circuit.

BRIEF DESCRIPTION OF DRAWINGS

Embodiments of an appliance incorporating an automatic stopping device according to the invention are described in detail hereinafter with reference to the accompanying drawings, wherein:

FIG. 3 is a section through a gear motor equipped with another embodiment of automatically reset stopping device, in its rest position;

FIG. 4 is a view, partly in section, through this same embodiment, in its triggered position;

FIG. 12 shows a lever and cam means for activating a switch in the motor supply line; and FIG. 13 shows a thermally activated switch in the motor supply line.

DESCRIPTION OF EMBODIMENTS

Figure 1:
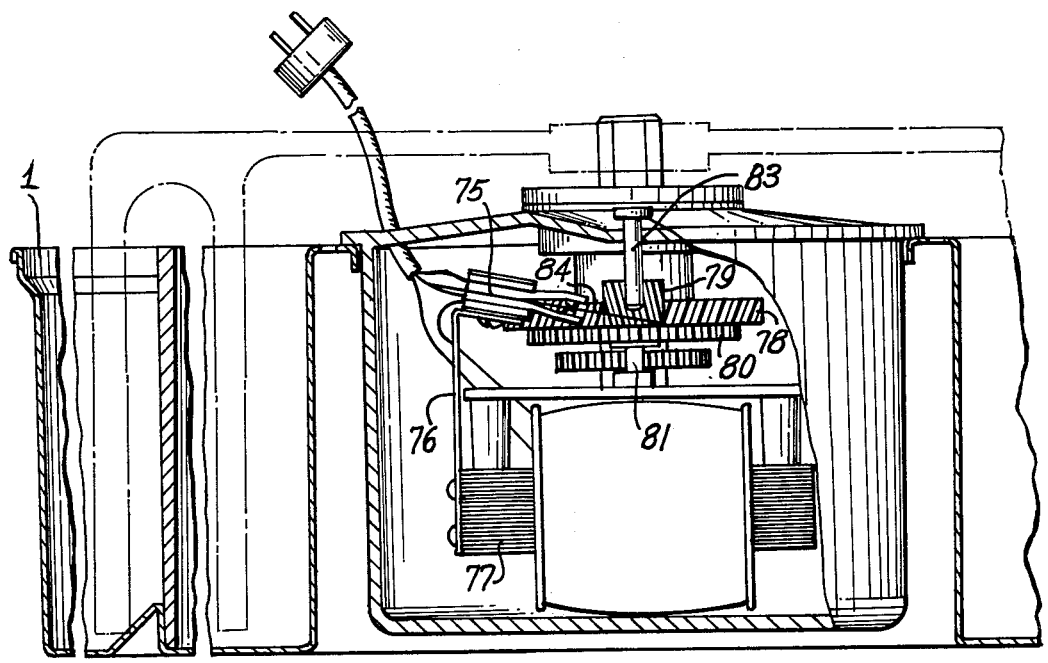
FIG. 1 is a section through an ice cream making appliance equipped with a gear motor having an axially displaceable stepped pinion.

FIG. 1 shows a tank 1 and a motor block shown partly in section comprising essentially the same principal elements as in U.S. Pat. No. 3,926,414. Microswitch 75 is of the sudden break reversing type whose contact 84, which normally stays in each of the two end positions, is fixed to the end of a bimetallic strip 76. The other end of this strip is fixed to the magnetic circuit 77 of the motor. Toothed rim 78 engages with pinion 79 which is an integral part of toothed wheel 80. The two toothed wheels 78 and 79 have helical toothing. The assembly 79–80 rotates about a shaft 81 and can be displaced longitudinally on this shaft. Other gear wheel trains (not shown) transmit movement from the motor through gears 79 and 80 to gear 78. A pushbutton 83 enables the mobile armature of the microswitch 75 to be pushed to its lower position.

Figure 2:
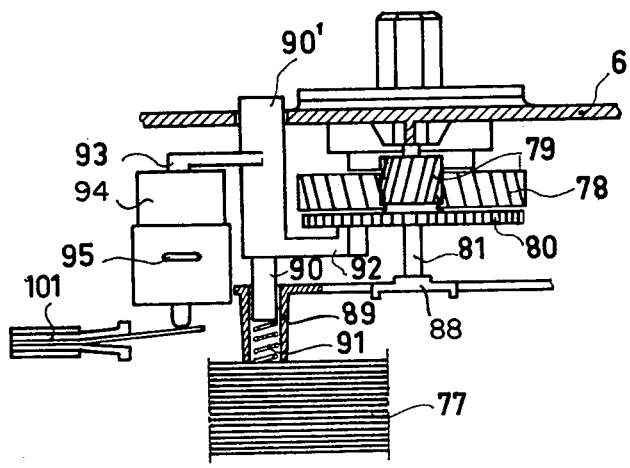
FIG. 2 is a partial view of a gear motor equipped with a stopping device having two limiting positions, which device can be manually reset by means of a push-button, the device being shown in its inoperative state.

FIG. 2 is an elevation of a gear motor equipped at the side with an automatic stopping device, the gear motor comprising the same principal elements as in patent application Ser. No. 429,820 filed Jan. 2, 1974, and shown in FIG. 1, namely: a helically toothed wheel 78 and a pinion 79 engaging with it; a toothed wheel 80, integral with the pinion 79, rotatable about a spindle 81 and freely displaceable axially thereon. The spindle 81 is mounted between a cover 6 of the motor housing and in a stirrup 88 of the drive motor, said motor stirrup being supported through feet 89 on plates 77.

In this embodiment, the automatic stopping device is formed as follows. One of the supporting feet 89 is formed with a bore in which a pushrod 90 is slidable. This pushrod 90, urged upwards by a spring 91, comprises a feeler 92 resting on the toothed wheel 80 and a finger 93. This finger 93 rests on a plate 94 slidable in a housing 95.

The operation of an appliance for making sorbet equipped with the above-described device will be used in the manner described hereinafter.

To begin with, pressure is applied to the end 90¹ extending through the cover 6 of the gear motor housing. This depresses the plate 94 which remains in its lower rest position, and keeps the miniature reversing switch 101 closed so that the gear motor does not receive current. After the sorbet-making appliance has been introduced into a refrigerator, the power cord is connected; the motor is thus started up. Since the mixing force is low, the pinion 80 remains in its upper position held by the action of the feeler 92 and the spring 91. As the mixing force increases, the wheel 80 descends, being subjected, as has already been seen, to the axial component of the torque between the parts 79 – 78. When the preparation to be iced is sufficiently hard, the wheel 80 is in its lowest position, keeping the assembly 92 — 90 — 93 and the plate 94 in their lower positions. When the blades withdraw, the engagement torque quickly disappears, the assembly 92 — 90 — 93 ascends under the action of the spring 91 and allows the plate 94 to ascend to the end position shown in FIG. 2. The movable armature of the microswitch follows this movement and breaks the motor feed circuit. If the second contact of the miniature reversing switch is included in the feed circuit of a buzzer, the buzzer is activated to indicate that the blades of the appliance are in their withdrawn position.

Instead of using a push-button for resetting, it would be possible in principle to act manually upon the arm supporting the blades in a direction opposite to that in which it normally rotates. The resistance offered by the reduction gear establishes an engagement torque at the toothed wheels 78 – 79 identical with that obtained during mixing. This torque acts on the assembly 92 — 90 — 93 and on the mechanism 94 - 95. It is thus possible to close the motor feed circuit before it is brought into operation. However, the force required for this purpose is fairly high, and resetting is not obtained with each manual intervention.

Figure 5:
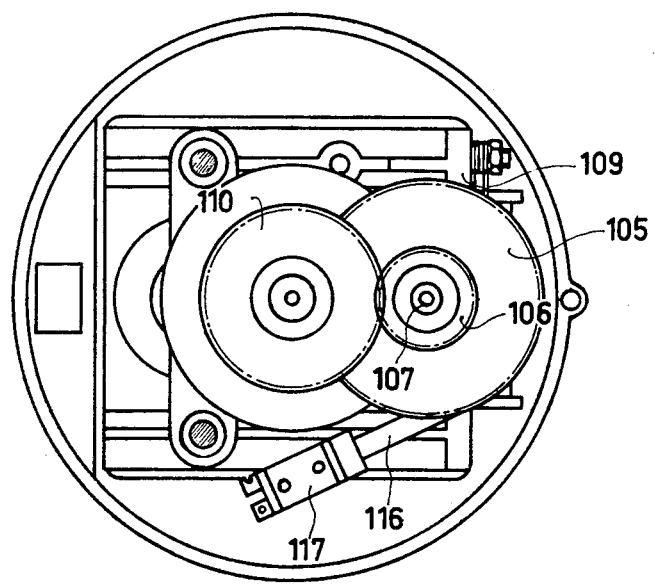
FIG. 5 is a view from beneath of the gear motor shown in FIGS. 3 and 4 with its cover removed.

A device without a push-button which is more reliable both in design and in use is described hereinafter with reference to FIGS. 3 to 5.

FIG. 3 shows the gear motor in its upper position with the motor circuit open.

FIG. 4 shows the upper part of the gear motor in its lower position with the motor circuit closed.

The gear motor (FIGS. 3, 4 and 5) operates as follows. The output pinion 102' of the electric motor 102 acts on an internally toothed ring 103 which comprises a stepped pinion 104 with rectangular teeth. A stepped toothed wheel, comprising rectangular teeth on its major diameter 105 and helical teeth 106 on its minor diameter, rotates about a spindle 107 sandwiched between the cover 108 and the stirrup 109 of the motor 102, the stirrup being specially constructed to accommodate the internally toothed ring 103. The stepped wheel 105 – 106 is adapted for axial displacement on the spindle 107. It meshes with a helically toothed wheel 110 fitted on to a drive hub 111. It is urged upwards by a spring pin 112 fixed to the stirrup 109.

The automatic stopping device is formed by a wheel 105 – 106 with a recess in which is accommodated a bell-shaped cam 113 adapted for radial and axial displacement on the spindle 107. This bell-shaped cam is acted on by spring 114 which applies it lightly against the base of the recess formed in the wheel 105 – 106. A countercam 115 forms an integral part of the cover 108.

It is already known that the stepped wheel 105 – 106 will be axially displaced according to the forces transmitted to the drive hub 111. In its displacement, this stepped wheel directly actuates the moving armature 116 of a miniature reversing switch 117. The reversing switch 117 is externally arranged in FIGS. 3 and 4 in order to simplify the drawing. In reality it is fixed to the stirrup 109 of the motor, as shown by the view from above in FIG. 1.

When the mixing force disappears through withdrawal of the blades, the stepped wheel 105 – 106 ascends under the effect of the spring pin 112 and pushes the cam into its rest position shown. The moving armature 116 of the miniature reversing switch accompanies the wheel 105 – 106, breaks the motor supply circuit and if desired establishes contact with an alarm.

The automatic stopping device may be actuated in a more simple manner by the blades themselves on completion of their withdrawal movement. In this particular embodiment, one of the blades is provided with a projection which may break the motor supply circuit in either of two different ways.

Figure 6:
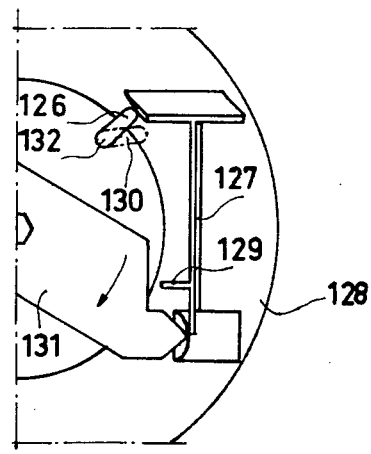
FIG. 6 is a view, partly from above, of an appliance for making sorbets equipped with an automatic stopping device triggered by one of the blades during the withdrawal thereof.

In a first embodiment (FIG. 6), a pivotable spindle 132 extends through the cover of the gear motor housing. At the end of the spindle inside the housing is mounted a cam whose function is to act on the movable armature of a microswitch or reversing switch shown in FIG. 12. That end of the spindle outside the casing is integral with a lever 126 actuated by a projection 129 on the blade 127, to break the motor supply circuit by entrainment of the cam.

In the rest position 126 of the lever shown in solid line, the electrical circuit of the motor is closed and the motor starts up as soon as the power cord of the appliance is connected. The blade 127 is lowered into the compartment 128 to freeze the preparation. When the blade is withdrawn under the increasing force generated by the freezing of the preparation, the projection 129 comes into contact with the lever 126 as the arm 131 rotates and causes it to pivot into the position 130 shown in broken line. This rotation results in breaking of the motor supply circuit and activation of the alarm, if any, under the action of the aforementioned cam.

When the appliance is used again, it is sufficient to grip the lever by hand to return it to its initial position 126.

Figure 10:
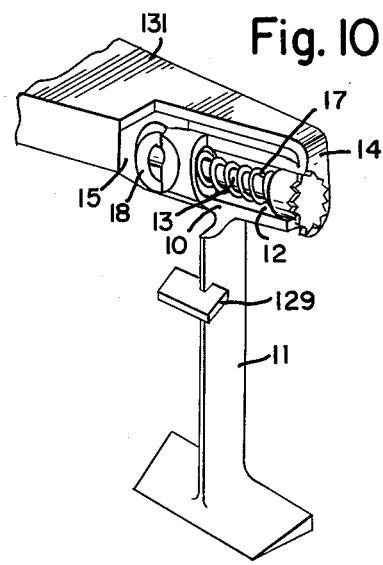
FIGS. 10 and 11 show a spring in the mixer blade raising mechanism.
Figure 11:
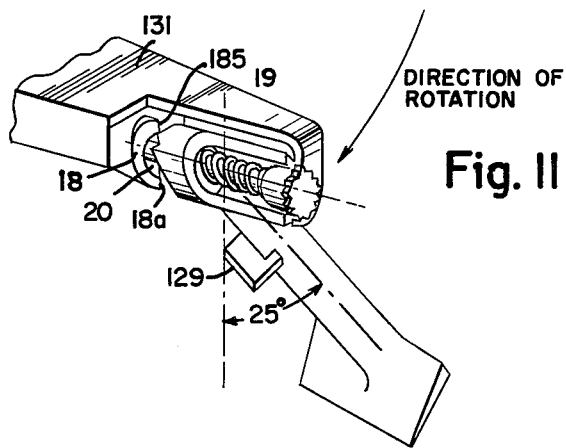

In order to be certain that the two or more blades have been withdrawn when the motor is stopped, it is necessary for the other blade to be withdrawn before the blade equipped with the projection 129. To this end, springs opposing the force attributable to mixing and accommodated in the hubs of the blades, are shown in FIGS. 10 and 11 as provided in application Ser. No. 292,121 of Sept. 25, 1972, now U.S. Pat. No. 3,916,637. FIGS. 10 and 11 correspond to FIGS. 4 and 5 of the patent with the addition of projection 129 thereto. Arm 131 may comprise at each end thereof two aligned forks 14 and 15 as shown in FIG. 10.

The fork 15 receives a nut set into plastic and on which is screwed a shaft 13 on which swivels a blade support 10. A cylindrical housing 12 enables a compression spring 17 supported on one side on the cylindrical shoulder of the support and on the other side on the shoulder of the swivel 13, to urge the blade support 10 towards the fork 15. The latter consists of a bevelled-shape element 18 in the form of a hollowed out slice of melon, which guides the blade support 10 into a V shaped slot 19, predetermining a preferential position of the blade support. The blade support 10 is rigid with the arm 11 holding the blade 22. It can be seen from this that a strong force applied on blade 22, creates a torque at the level of the support 10. The two parts 18a and 18b of the conical angle of the bevel 18 tend to come out of the slot 19, compressing the spring 17 and creating an alteration of angle between the parts 18 and 19.

The possibility of greater or lesser ease of rotation of the support 10 depends on the compression force imposed on the spring 17.

Thus, as long as the consistency of the cream to be frozen is inadequate, the arm 11 remains vertical and the blade 22 scrapes the bottom of the freezer. When this consistency has reached a certain degree, the arm 11 puts a brake on the drive along the arm 131, and there comes a moment when this arm 11, forced backwards, pushes the angle edges 18a and 18b out of the slot 19, at the same time compressing the spring 17. Then, the action of this spring coupled with the alteration of angle of the inclined planes 27 and 28, starts the automatic raising of the arm 11 until the sharp edges of the slot 19 fall back into the hollowed out part 20 between the conical parts 18a and 18b of the bevel 18.

Because of this, the blade 22 is completely raised out of the top of the ice-cream which has reached an adequate consistency. The force of the spring 17 is clearly calculated depending on the consistency to be obtained, so that a complete withdrawal of the blades from the ice-cream is obtained.

In the present situation, the springs opposing the mixing forces are accordingly different. The spring accommodated in the blade which does not perform the function of stopping the motor is weaker than the blade by which the motor is stopped. In this way, it is possible to be certain that the two blades are withdrawn at the required moment.

However, this extremely simple system can satisfactorily be used only in appliances making sorbets with a single flavour. For appliances making sorbets with two flavours, comprising a circular partition according to application Ser. No. 292,121 filed Sept. 25, 1972 and having a blade in each of the compartments thus formed, some uncertainty exists in regard to the degree of withdrawal of the blades because the freezing times differ according to the flavours and to the nature of the preparation.

Figure 8:
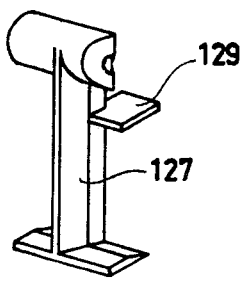
FIG. 8 is a perspective view of a blade adapted to stop a sorbet-making appliance.
Figure 7:
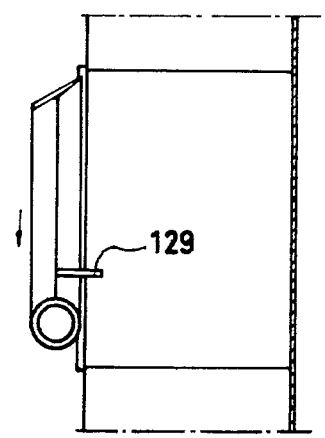
FIG. 7 is a side elevation of this stopping device.

FIG. 7 is a side view of the same device taken inside the compartment of the appliance, whilst FIG. 8 is a perspective view of the blade 127 provided with the projection 129. In a second embodiment (see FIG. 13), rotation of the arms 131 and blades 127 is blocked by means of a stop similar to the lever 126 but fixed to the gear motor housing. When the blade 127 is withdrawn, the projection 129 immobilises the arm by engagement with the above-mentioned stop. The motor, immobilised as a result, but still under voltage, heats up. A temperature limiter, included in the magnetic circuit of the motor and in series with the motor supply feed circuit, breaks the motor supply circuit. The stop is preferably mounted resiliently to prevent sudden stoppage. The motor may be started up again by resetting the temperature limiter by a suitable push-button device.

Figure 9:
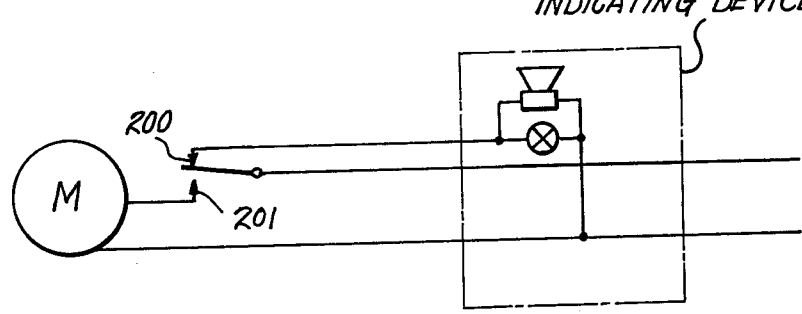
FIG. 9 is a circuit diagram representing the position of the switch in the motor supply lines.

FIG. 9 illustrates the use of a reversing type of switch in the motor supply circuit. When the switch is at 200, the circuit to the motor is cut off, and the indicating device is activated.

FIG. 12 illustrates the switching mechanism for breaking the motor supply circuit responsive to actuation of lever 126 by projection 129. Specifically, cam 22, mounted within the housing (shown interior to an below cover 6 of the housing) is connected to lever 126 by spindle 132. When projection 129 (not shown in the figure) causes lever 126 to rotate to its alternate position 130, cam 22 is similarly rotated and actuates armature 26 of switch 28 controlling the motor supply circuit.

FIG. 13 illustrates the alternative embodiment, showing a stop 128 for contacting projection 129. Upon the stoppage of arm 131 by stop 128, the driving motor is immobilized, but is still provided current. Accordingly, the motor heats up, and a thermal switch 130, sensitive to the increased motor temperature, contorls the motor supply circuit, thereby breaking the circuit and disconnecting the motor. The stop may be elastically mounted.

We claim:

1. In an appliance for making sorbet or ice cream, wherein the appliance has a driving spindle projecting from a gear motor housing to which a rotating arm supporting mixing blades thereon is attached, and wherein said appliance includes means for preventing the mixer blades from becoming locked in ice by effecting a progressive withdrawal of the blades from a vertical orientation towards a horizontal orientation under the action of an opposing torque applied to the blades by the hardening of the ice during freezing, the improvement comprising:

an automatic stopping device including a projection means provided on one of the blades for contacting a lever mounted on the periphery of a cover for the gear motor housing and opposing continued rotation of said arm supporting the blades on completion of the withdrawal of the blades, said projection means causing said lever to pivot when the blade reaches its withdrawn position and a switching means for opening the motor supply circuit responsive to said projection means contacting said cooperating means wherein said switching means is activated by a cam rotated by a spindle mounting said lever on said cover.

2. An appliance as claimed in claim 1, wherein the means for withdrawing the blades is adjusted so that the blade provided with the projection is movable to its withdrawn position with a slight delay relative to the other blade or blades.

3. In an appliance for making sorbet or ice cream, wherein the appliance has a driving spindle projecting from a gear motor to which a rotating arm supporting mixing blades thereon is attached, and wherein said appliance includes means for preventing the mixer blades from becoming locked in ice by effecting a progressive withdrawal of the blades from a vertical orientation towards a horizontal orientation under the action of an opposing torque applied to the blades by hardening of the ice during freezing, the improvement including an automatic stopping device comprising:

a projection means provided on one of the blades;

a stop fixed to the edge of a cover for the gear motor housing for engagement by said projection means when said blade has withdrawn to clear the ice wherein rotation of the arm supporting the blades is opposed and blocked while the motor drive is applied thereto, and a temperature limiter disposed between the motor drive and the supply current therefor to interrupt the supply current when the motor becomes heated due to opposition and blocking by said stop.

4. An appliance as claimed in claim 3, wherein the stop is elastically mounted.

* * * * *

UNITED STATES PATENT OFFICE
CERTIFICATE OF CORRECTION

Patent No. 4,092,835                      Dated June 6, 1978

Inventor(s) Pierre Tanguy and Andre Faivre

It is certified that error appears in the above-identified patent and that said Letters Patent are hereby corrected as shown below:

On title page, assignee data should read:

-- Etud, Dijon, France --.

Signed and Sealed this

*Twentieth* Day of *February 1979*

[SEAL]

*Attest:*

RUTH C. MASON                      DONALD W. BANNER

*Attesting Officer*               *Commissioner of Patents and Trademarks*